(12) United States Patent
Tracy

(10) Patent No.: US 10,412,474 B2
(45) Date of Patent: Sep. 10, 2019

(54) MODULAR SPEAKER SYSTEM

(71) Applicant: Dennis A. Tracy, Culver City, CA (US)

(72) Inventor: Dennis A. Tracy, Culver City, CA (US)

( * ) Notice: Subject to any disclaimer, the term of this patent is extended or adjusted under 35 U.S.C. 154(b) by 33 days.

(21) Appl. No.: 15/802,128

(22) Filed: Nov. 2, 2017

(65) Prior Publication Data

US 2018/0146271 A1 May 24, 2018

Related U.S. Application Data

(60) Provisional application No. 62/416,244, filed on Nov. 2, 2016.

(51) Int. Cl.
| | |
|---|---|
| *H04R 1/02* | (2006.01) |
| *H04R 3/12* | (2006.01) |
| *G06F 3/16* | (2006.01) |

(52) U.S. Cl.
CPC ............. *H04R 1/025* (2013.01); *G06F 3/165* (2013.01); *H04R 1/021* (2013.01); *H04R 3/12* (2013.01); *H04R 2201/025* (2013.01); *H04R 2420/07* (2013.01); *H04R 2499/11* (2013.01)

(58) Field of Classification Search
CPC ...... H04R 1/025; H04R 3/12; H04R 2499/11; G06F 3/165
See application file for complete search history.

(56) References Cited

U.S. PATENT DOCUMENTS

| | | | | |
|---|---|---|---|---|
| 5,115,882 A | * | 5/1992 | Woody | H04R 1/345 181/144 |
| 5,623,132 A | * | 4/1997 | Gahm | H04R 1/2826 181/156 |
| 5,996,728 A | * | 12/1999 | Stark | H04R 1/028 181/144 |
| 7,441,630 B1 | * | 10/2008 | Herrington | H04R 1/026 181/148 |
| 8,165,333 B2 | * | 4/2012 | Tracy | H04R 1/26 181/145 |

(Continued)

OTHER PUBLICATIONS

TOA, Electronic Amplifier Guide, 2004.*
Boards.core, rings modular speaker, boards.core77.conn (Year: 2008).*

*Primary Examiner* — Davetta W Goins
*Assistant Examiner* — Kuassi A Ganmavo
(74) *Attorney, Agent, or Firm* — Welsh Flaxman & Gitler LLC

(57) ABSTRACT

A modular speaker system includes a plurality of speaker modules configured prior to use to function in reproducing various sound channels depending upon specific desires of a user. Each of the plurality of speaker modules includes a substantially cylindrical housing including an open first end and a closed second end, as well as a cylindrical sidewall extending between the first end and the second end. Each speaker module also includes a first driver secured within the first end of the housing, the first driver being mounted within the first end of the housing for directing sound outwardly, and a second driver positioned within the housing at a central position between the first end and the second end of the housing. A plurality of circular rings are positioned around the housing allowing for control of the speaker module in various ways.

18 Claims, 4 Drawing Sheets

(56) References Cited

U.S. PATENT DOCUMENTS

| | | | |
|---|---|---|---|
| 2006/0147075 A1* | 7/2006 | Vu | H04R 9/063 |
| | | | 381/335 |
| 2007/0046108 A1* | 3/2007 | Pearson | G02B 26/06 |
| | | | 310/10 |
| 2011/0280407 A1* | 11/2011 | Skinner | H03G 3/3005 |
| | | | 381/28 |
| 2012/0069540 A1* | 3/2012 | Lauder | G06F 1/1626 |
| | | | 361/807 |
| 2013/0039527 A1* | 2/2013 | Jensen | H04R 1/24 |
| | | | 381/387 |

* cited by examiner

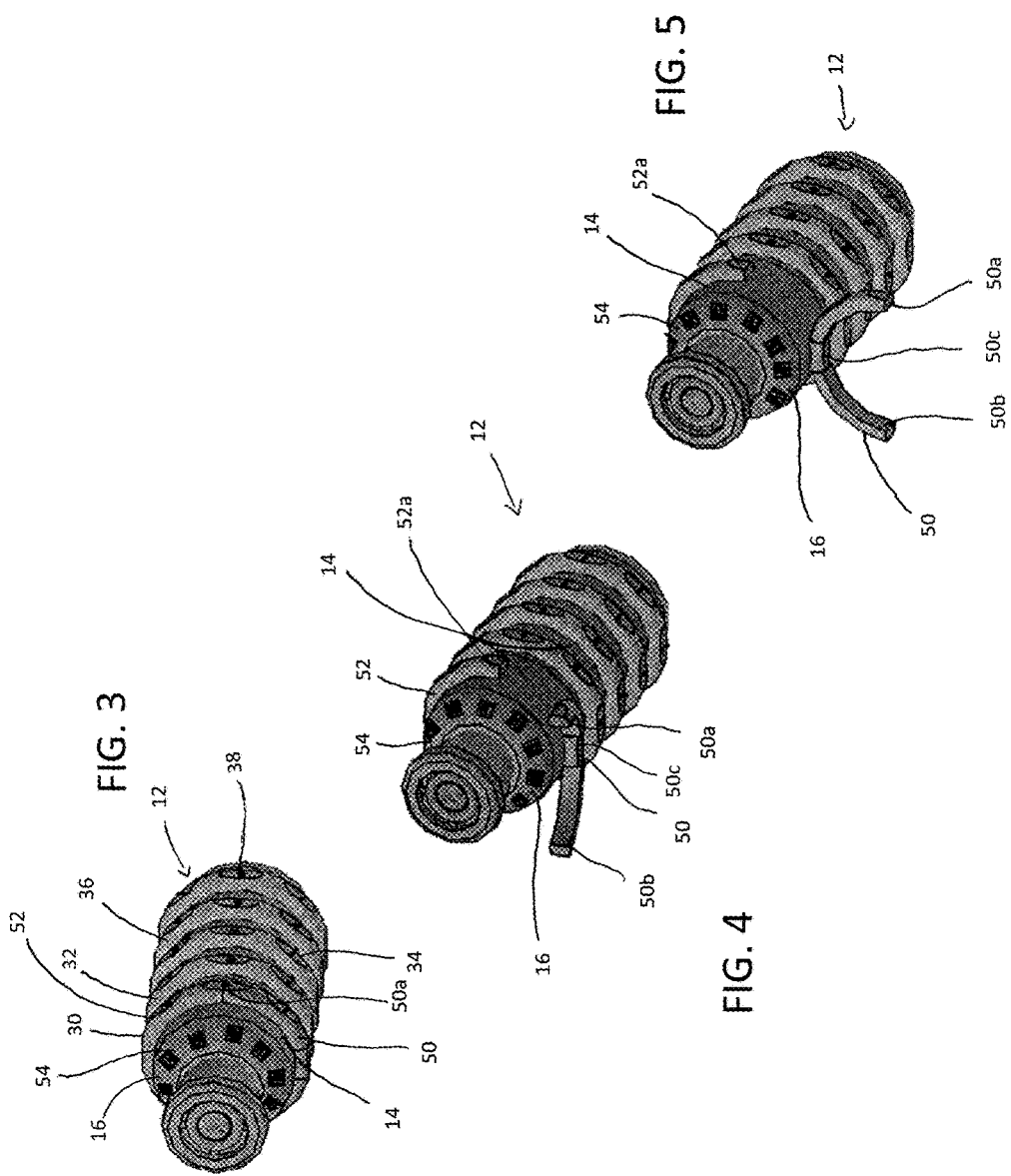

MODULAR SPEAKER SYSTEM

CROSS REFERENCE TO RELATED APPLICATION

This application claims the benefit of U.S. Provisional Patent Application Ser. No. 62/416,244, entitled "MODULAR SPEAKER SYSTEM," filed Nov. 2, 2016.

BACKGROUND OF THE INVENTION

1. Field of the Invention

The invention relates to a modular speaker system.

2. Description of the Related Art

Speaker technology has consistently attempted to reproduce a recorded sound in the most realistic manner possible. The vast majority of speaker designs employ a variety of sound drivers mounted within an acoustic box. The sound drivers are mounted along a face of the acoustic box in the direction along which the sound is to be directed. These designs are static and not amenable to variation as the needs of the user change or as the speakers are moved from location to location.

In today's mobile ever changing society, it is important that consumer products be useful for various purposes and in a variety of environments. As such, a need exists for small, aesthetically pleasing speakers, which do not sacrifice sound quality for the ability to modify or otherwise use the loudspeakers in various environments. The present speaker system addresses these deficiencies by providing a modular speaker that is versatile, small, and easily adapted to suit various environments and listening needs.

SUMMARY OF THE INVENTION

It is, therefore, an object of the present invention to provide a modular speaker system including a plurality of speaker modules configured prior to use to function in reproducing various sound channels depending upon specific desires of a user. Each of the plurality of speaker modules includes a substantially cylindrical housing including an open first end and a closed second end, as well as a cylindrical sidewall extending between the first end and the second end. A first driver is secured within the first end of the housing, the first driver being mounted within the first end of the housing for directing sound outwardly. A second driver is positioned within the housing at a central position between the first end and the second end of the housing. A plurality of circular rings are positioned around the housing allowing for control of the speaker module in various ways.

It is also an object of the present invention to provide a modular speaker system wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

It is another object of the present invention to provide a modular speaker system wherein an enclosure isolates the first driver within the housing and the enclosure creates first and second isolated chambers within the housing, the first driver being within the first isolated chamber and the second driver being within the second isolated chamber.

It is a further object of the present invention to provide a modular speaker system wherein the enclosure is substantially cup-shaped.

It is also an object of the present invention to provide a modular speaker system wherein slits are formed in the housing and are part of the second isolated chamber such that audio signals generated by the second driver may pass through the slits.

It is another object of the present invention to provide a modular speaker system wherein the plurality of rings includes first, second, third, fourth and fifth rings positioned about the housing from the open first end thereof to the closed second end thereof.

It is further an object of the present invention to provide a modular speaker system wherein one of the plurality of rings pivots about the housing for the purpose of turning the speaker module on or off.

It is also an object of the present invention to provide a modular speaker system wherein one of the plurality of rings moves between a first position and a second position to switch the speaker module from a nominal 4 ohm operating configuration to a nominal 8 ohm operating configuration.

It is another object of the present invention to provide a modular speaker system wherein one of the plurality of rings rotates to open a port within the side wall of the housing.

It is a further object of the present invention to provide a modular speaker system wherein one of the plurality of rings functions as a stand member allowing for elevation of the speaker module as a desired by user.

It is also an object of the present invention to provide a modular speaker system wherein the one of the plurality of rings includes an arcuate semi-circular first member and an arcuate semi-circular second member, the first member being pivotally secured to the housing for movement between different configurations.

It is another object of the present invention to provide a modular speaker system wherein each of the rings includes a plurality of flat surfaces equidistantly positioned about the circumference thereof, the flat surfaces being shaped and dimensioned for attachment to the flat surfaces of other speaker modules such that the speaker modules may be connected in a desired manner.

It is a further object of the present invention to provide a modular speaker system wherein the flat surfaces are magnetically active.

It is also an object of the present invention to provide a modular speaker system wherein the flat surfaces include electrical leads allowing for communication amongst the various speaker modules.

It is another object of the present invention to provide a speaker module configured prior to use to function in reproducing various sound channels depending upon specific desires of a user. The speaker module includes a substantially cylindrical housing including an open first end and a closed second end, as well as a cylindrical sidewall extending between the first end and the second end. A first driver is secured within the first end of the housing, the first driver being mounted within the first end of the housing for directing sound outwardly. A second driver is positioned within the housing at a central position between the first end and the second end of the housing. A plurality of circular rings are positioned around the housing allowing for control of the speaker module in various ways.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 3, 4 and 5 are respectively view of the speaker module in a ring configuration, a forward support configuration, and a downward support configuration.

DESCRIPTION OF THE PREFERRED EMBODIMENT

Figure 1:
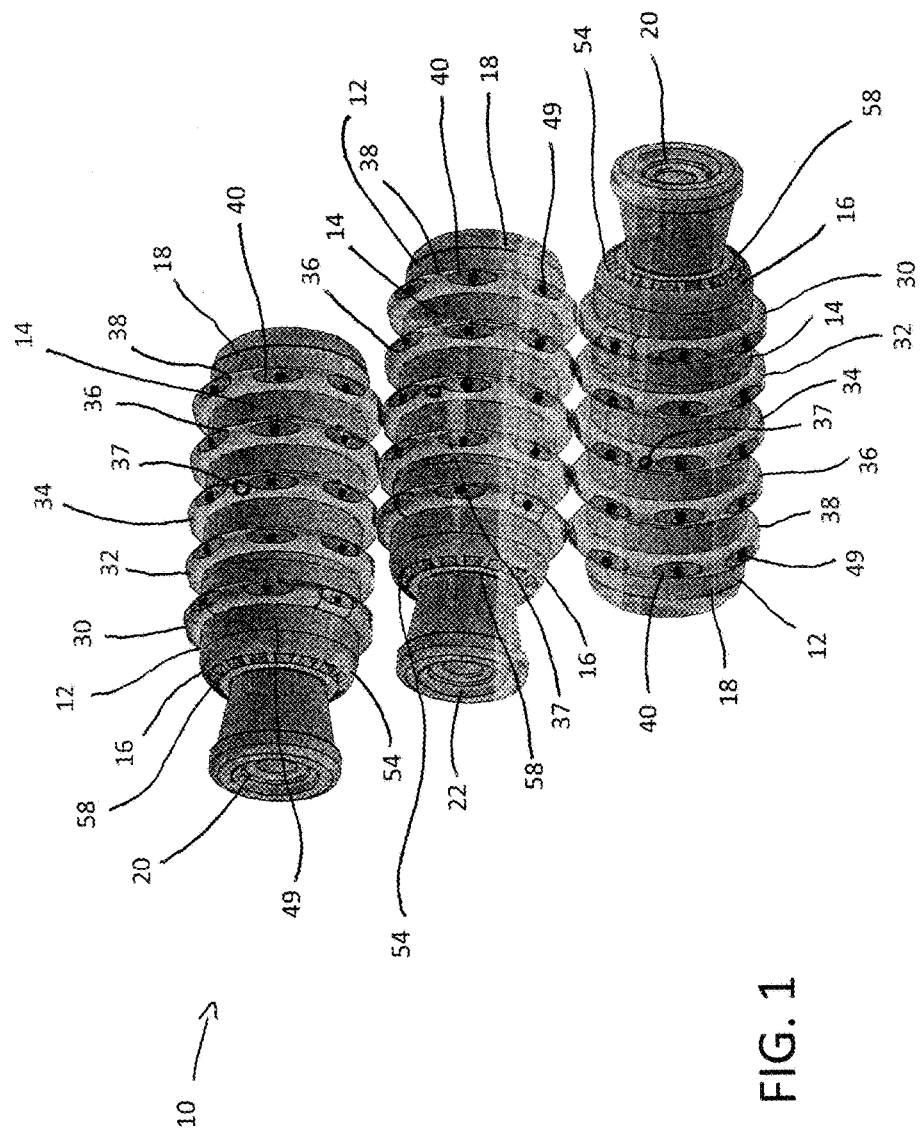
FIG. 1 is a perspective view of a speaker system including a plurality of speaker modules in accordance with a preferred embodiment.
Figure 2:
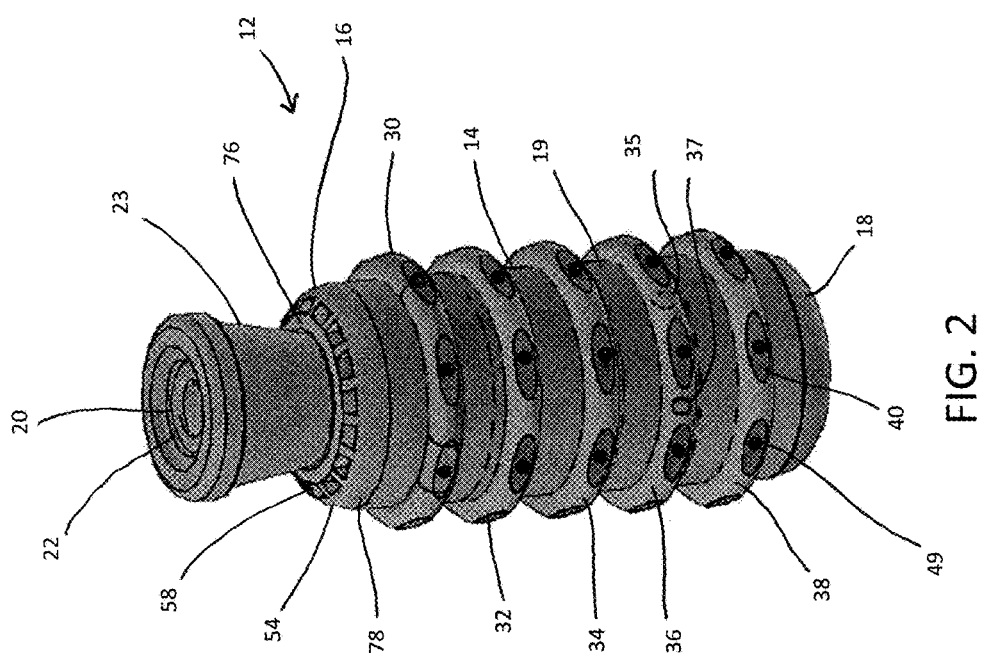
FIG. 2 is a perspective view of a speaker module in accordance with the present invention.
Figure 7:
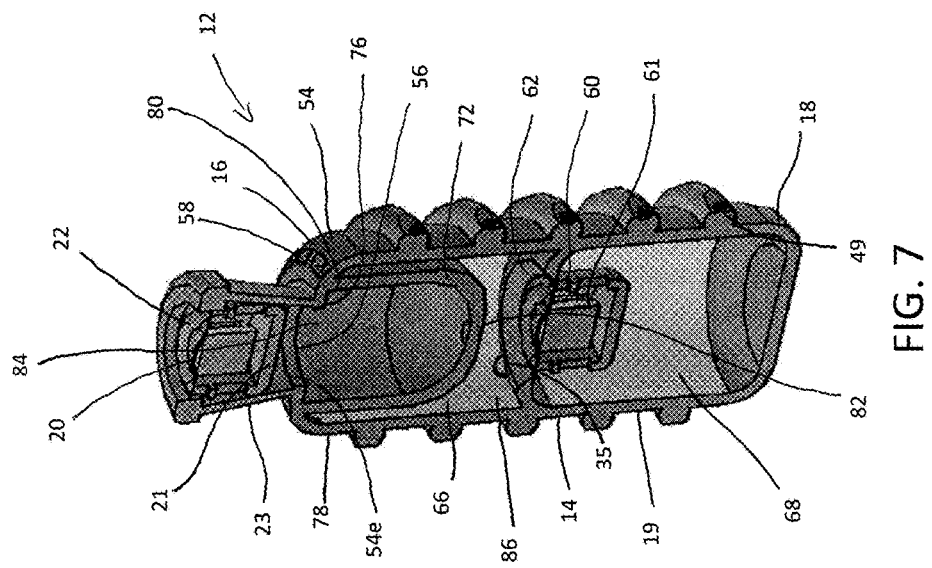
FIGS. 6 and 7 are respectively a cut-away view and a cross-sectional view of the speaker module shown in FIG. 2.
Figure 6:
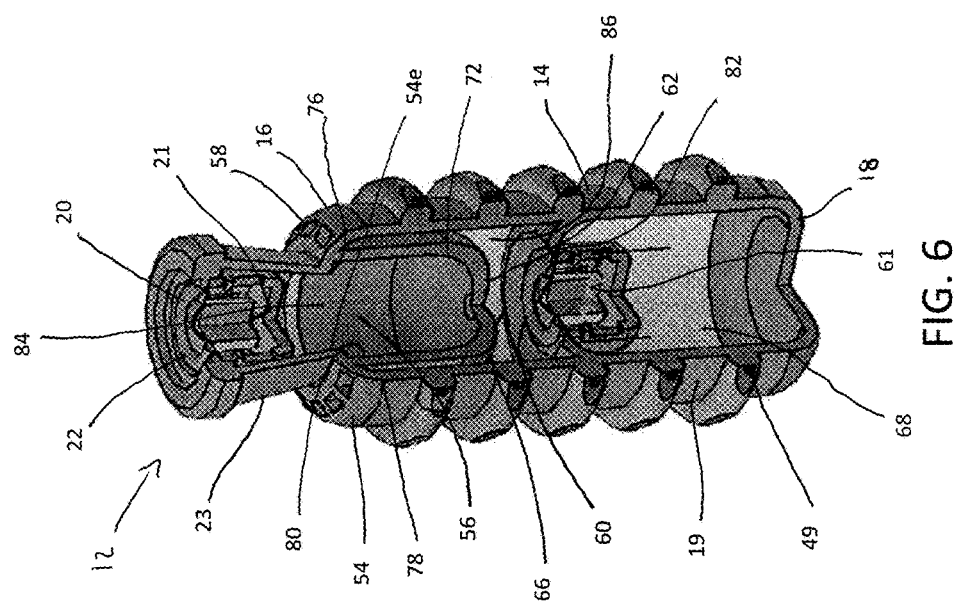

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to the various figures, a modular speaker system 10 is disclosed. The modular speaker system 10 includes a plurality of speaker modules 12 which may be selectively connected in a variety of configurations depending upon the desires and requirements of the user.

With the exception of details discussed below, each of the speaker modules 12 is identical. When used in accordance with a preferred embodiment of the present invention, the speaker modules 12 are configured prior to use to function in reproducing various sound channels, for example, low frequency, high frequency, mid-range, left/right, etc., depending upon the specific desires of the user.

One of the speaker modules 12 will now be described in detail. It should be appreciated that the following explanation applies to the other speaker modules, with the exception of permissible variations as discussed throughout the present disclosure.

The speaker module 12 includes a substantially cylindrical housing 14. The housing 14 includes a first end 16 (open with a central aperture 56 and slits (or slots, channels, or ducting) 58) and a closed second end 18, as well as a cylindrical sidewall 19 extending between the first end 16 and the second end 18. The housing 14 is preferably made from aluminum, stainless steel, plastic, resins, carbon fiber or other materials offering desirable acoustic characteristics (and so as to allow some the complex shapes to be 3-D printed (that is, produced via additive manufacturing).

The housing 14 supports a first driver 20 in the first end 16 thereof. The first driver 20 is mounted within the first end 16 of the housing 14 such that the driver's magnet 21 is positioned within the housing 14 while the driver cone 22 faces away from the interior of the housing 14 for directing sound outwardly. In particular, the first end 16 of the housing 14 is provided with an inwardly directed annular support ring 54 defining a central aperture 56. The first driver 20 is mounted within the central aperture 56 such that the concave portion of the driver cone 22 is directed away from the interior of the housing 14, while the convex portion of the driver cone 24 and the magnet are directed toward the interior of the housing 14. The first driver 20 also includes a frusto-conical driver support 23, which is directly secured to the annular support ring 54 and holds the magnet 21 and driver cone 22 at a position above the first end 16 of the housing 14. The first driver 20 completely closes off the central aperture 56 at the first end 16 of the housing 14 and seals the interior of the housing 14 from the external environment, with the exception of radially oriented slits 58 formed in the annular support ring 54 and selectively opened ports (not shown) in the side walls 26 of the housing 14 that will be discussed in greater detail below.

Adhesive secures the first driver 20, in particular, the frusto-conical driver support 23 of the first driver 20, to the inwardly directed edge 54e of the annular support ring 54, although other mounting techniques may be used without departing from the spirit of the present invention so long as the first driver 20 completely closes off the central aperture 56 at the first end 16 of the housing 14, sealing the interior of the housing 14 from the external environment.

A second driver 60 is positioned within the housing 14. In particular, the second driver 60 is mounted within the housing 14 at a central position between the first end 16 and the second end 18 of the housing 14. The second driver 60 is mounted in alignment with the first driver 20 such that a central longitudinal axis of the housing 14 extends through the center of both the first driver 20 and the second driver 60. The second driver 60 is mounted such that the driver's magnet 61 faces the second end 18 of the housing 14 while the driver cone 62 faces the first end 16 of the housing 14 for directing sound toward the first end 16 of the housing 14 and the first driver 20. In particular, the second driver 60 is mounted within the housing 16 such that the concave portion of the driver cone 62 is directed away from the second end 18 of the housing 14, while the convex portion of the driver cone 62 and the magnet 61 are directed toward the second end 18 of the housing 14. The second driver 60 completely closes off the housing 14 and divides the interior of the housing 14 into an upper portion 66 adjacent the first end 16 of the housing 14 and a lower portion 68 adjacent the second end 18 of the housing 14. Sound generated by the second driver 60 is permitted to escape the housing 14 by way of the slits 58 formed in the annular support ring 54. The positioning of the slits 58 within the annular support ring 54 adjacent the first end 16 of the housing 14 allows for the directional sound generated by the second driver 60 to be coaxial with the directional sound generated by the first driver 50. Adhesive secures the edges of the second driver 60 to the interior wall 70 of the housing 14, although other mounting techniques may be used without departing from the spirit of the present invention.

Isolation of the first driver 20 within the housing 14 is achieved by the provision of an enclosure 72 secured to the inner end 76 of the annular support ring 54. In particular, annular support ring 54 includes an inner end 76 and an outer end 78. The outer end 78 is secured to the cylindrical sidewall 19 at the first end 16 of the housing 14 such that the annular support ring 54 extends radially inward from the outer end 78 to the inner end 76. The enclosure 72 creates first and second isolated chambers 84, 86 within the housing 14. In particular, the first driver 20 is within the first isolated chamber 84 and the second driver 60 is within the second isolated chamber 86. In this way the sound and heat generated by the first and second drivers 20, 60 provide for an optimal audio expression. For example, the first and second drivers 20, 60 have an influence on each other, as a result of resonances of the enclosure 72. The overall effect sought in accordance with the present invention is the musical marriage of the first and second drivers 20, 60, as well as the enclosure 72, to provide a natural and homogeneous audio expression More particularly, the enclosure 72 is substantially cup-shaped and includes an open first end 80 secured to the annular support ring 54 adjacent the inner end 76 thereof and a closed second end 82 extending downwardly into the housing 14. By securing the enclosure 72 adjacent to the inner end 76 of the annular support ring 54, that portion of the annular support ring 54 between the enclosure 72 and the outer end 78 is within the second isolated chamber 86. As such, the slits 58 formed in the annular support ring 54 are formed between the enclosure 72 and the outer end 78 so as to be part of the second isolated chamber 86 allowing audio signals generated by the second driver 60 to pass through the slits 58. That is, the sound waves generated by the second driver 60 pass upwardly toward the first end 16 of the housing 14, around the enclosure 72, and are omitted through the slits 58.

In accordance with preferred embodiments, the first driver 20 is a mid-high frequency driver, and the second driver 60 is a micro-woofer or a low-mid frequency driver. In fact, and as will be appreciated based upon the following disclosure, a user will preferably have access to a plurality of speaker modules 12 with different drivers. The user will, therefore, combine the speaker modules 12 in a manner to optimize the reproduction of the sound to suit the specific needs of the user.

Positioned around the housing 14 is a series of circular rings 30, 32, 34, 36, 38. The rings 30, 32, 34, 36, 38 allow for control of the speaker modules 12 in various ways. In particular, first, second, third, fourth, and fifth rings 30, 32, 34, 36, 38 are positioned about the housing 14 and extend from the open first end 16 thereof to the closed second end 18 thereof. The first ring 30 is positioned adjacent the open first end 16 of the housing 14, the fifth ring 38 is positioned adjacent the closed second end 18 of the housing 14 and the remaining rings 32, 34, 36 are positioned between the first ring 30 and the fifth ring 38 in an equidistant arrangement. With regard to the second ring 32, it is designed to pivot about the housing 14 for the purpose of turning the speaker module 12 on or off. As such, it may be rotated between first and second positions where the first position powers up the speaker module 12 and the second position turns off the speaker module 12. The fifth ring 38 is designed to move in a similar manner between a first position and a second position so as to switch the speaker module 12 from a nominal 4 ohm operating configuration to a nominal 8 ohm operating configuration. This impedance switching capability allows for optimization of any connected audio amplifier and, additionally, allows for multiple speaker modules 12 to be interconnected with impedance loading being determined by using either series or parallel connections or a combination thereof. Still further, the central third ring 34 is adapted for rotation in such a way that rotation opens a port(s) 35 within the side walls 26 of the housing 14 by aligning an aperture(s) 37 in the central third ring 34 with the port(s) 35 as the central third ring 34 is rotated. It is appreciated the functionalities offered by the various rings may be distributed amongst the rings in a variety of ways to suit the needs for specific applications and functionalities.

In addition, and as the figures show, the rings 30, 32, 34, 36, 38 are not perfectly flat along their outer surfaces but rather include a plurality of flat surfaces 40 equidistantly positioned about the circumference thereof. These flat surfaces 40 are shaped and dimensioned for attachment to the flat surfaces 40 of other speaker modules 12 such that the speaker modules 12 may be connected in a desired manner. With this in mind, these flat surfaces 40 are magnetically active so that magnetic attraction will allow for the connection of adjacent modules 12 in a variety of desired configurations. Still further, these flat surfaces 40 include electrical leads 49 allowing for communication amongst the various speaker modules 12. The electrical leads 49 are connected in an intricate circuit pattern (not shown) to allow for connection of the various speaker modules 12 as desired by the user. For example, the speaker modules 12 may be connected in parallel, may be connected in series, or may be connected in other ways that allow for optimized use thereof.

Further versatility is achieved by structuring the first ring 30 to function as a stand member allowing for elevation of the speaker module 12 as a desired by user. The first ring 30 is composed of an arcuate semi-circular first member 50 and an arcuate semi-circular second member 52. The first member 50 is pivotally secured to the housing 14 for movement between a ring configuration (see FIG. 3 where the first and second members 50, 52 define a ring), a forward support configuration (see FIG. 4) and a downward support configuration (see FIG. 5).

When the first member 50 is rotated to the forward support configuration, the first member 50 provides lateral support such that when the speaker module 12 is placed upon a support surface it will not roll as the first member 50 extends laterally to limit the ability for lateral movement. When the first member 50 is rotated to the downward support configuration, the first member 50 provides both lateral support and horizontal support such that when the speaker module 12 is placed upon a support surface it will not roll and the open second end 18 is supported above the support surface while the closed second end 18 sits directly upon the support surface.

More particularly, both the first member 50 and the second member 52 are arcuate and include a first end 50a, 52a and a second end 50b, 52b. The second member 52 is secured about the housing 14 such that the central radial axis defined by the second member 52 is the same as the central longitudinal axis of the housing 14.

In contrast, the first member 50 is secured to the housing 14 so that it may be rotated to various positions as discussed above. The first member 50, therefore, includes a central section 50c between the first end 50a and the second end 50b. The central section 50c is pivotally secured to the housing 14 such that the first end 50a and the second end 50b may be rotated toward and away from the housing 14 as desired by the user.

When in the ring configuration as shown in FIG. 3, the first ring 50 is positioned such that first ends 50a, 52a and second ends 50b, 52b of the first and second members 50, 52 are respectively positioned adjacent each other such that the first member 50 and the second member 52 define a complete circular path. As such, and when in this configuration, the central radial axis defined by the first member 50 is the same as the central longitudinal axis of the housing 14 and the central radial axis of the second member 52.

Rotation of the first member 50 ninety degrees from the ring configuration results in the first member 50 assuming the forward support configuration (see FIG. 4). In this configuration, the first and second ends 50a, 50b of the first member 50 point toward the first end 16 of the housing 14 and the first member 50 lies in a plane that is substantially perpendicular to the plane in which the second member 52 lies. Still further, the central radial axis defined by the first member 50 is perpendicular to the central longitudinal axis of the housing 14 and the central radial axis of the second member 52.

Rotation of the first member 50 one-hundred eighty degrees from the ring configuration results in the first member 50 assuming the downward support configuration (see FIG. 5). In this configuration, the first and second ends 50a, 50b of the first ring 50 point away from the central longitudinal axis of the housing 14 and the first member 50 lies in a plane that is substantially the same as the plane in which the second member 52 lies. Still further, the central radial axis defined by the first member 50 is parallel to the central longitudinal axis of the housing 14 and the central radial axis of the second member 52.

As will be appreciated by those skilled in the art, the speaker modules 12 are provided with known connection structures (not shown) for linking with a sound source. Further, it is also appreciated, the speaker modules 12 may be provided with a Bluetooth transceiver for wireless signal transmission.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A modular speaker system, comprising:
a plurality of speaker modules configured prior to use to function in reproducing various sound channels depending upon specific desires of a user, each of the plurality of speaker modules comprising:
a cylindrical housing including an open first end and a closed second end, as well as a cylindrical sidewall extending between the first end and the second end;
a first driver secured within the first end of the housing, the first driver being mounted within the first end of the housing for directing sound outwardly;
a second driver positioned within the housing at a central position between the first end and the second end of the housing;
a plurality of circular rings positioned around the housing allowing for control of the speaker module, at least one of the circular rings including electrical leads allowing for communication amongst the various speaker modules, wherein one of the plurality of rings pivots about the housing for the purpose of turning the speaker module on or off.

2. The modular speaker system according to claim 1, wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

3. The modular speaker system according to claim 1, wherein an enclosure isolates the first driver within the housing, and the enclosure creates first and second isolated chambers within the housing, the first driver being within the first isolated chamber and the second driver being within the second isolated chamber.

4. A modular speaker system comprising:
a plurality of speaker modules configured prior to use to function in reproducing various sound channels depending upon specific desires of a user, each of the plurality of speaker modules comprising:
a cylindrical housing including an open first end and a closed second end as well as a cylindrical sidewall extending between the first end and the second end;
a first driver secured within the first end of the housing, the first driver being mounted within the first end of the housing for directing sound outwardly;
a second driver positioned within the housing at a central position between the first end and the second end of the housing;
a plurality of circular rings positioned around the housing allowing for control of the speaker module at least one of the circular rings including electrical leads allowing for communication amongst the various speaker modules, wherein one of the plurality of rings moves between a first position and a second position to switch the speaker module from a nominal 4 ohm operating configuration to a nominal 8 ohm operating configuration.

5. The modular speaker system according to claim 4, wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

6. The modular speaker system according to claim 4, wherein an enclosure isolates the first driver within the housing, and the enclosure creates first and second isolated chambers within the housing, the first driver being within the first isolated chamber and the second driver being within the second isolated chamber.

7. A modular speaker system, comprising:
a plurality of speaker modules configured prior to use to function in reproducing various sound channels depending upon specific desires of a user, each of the plurality of speaker modules comprising:
a cylindrical housing including an open first end and a closed second end, as well as a cylindrical sidewall extending between the first end and the second end;
a first driver secured within the first end of the housing, the first driver being mounted within the first end of the housing for directing sound outwardly;
a second driver positioned within the housing at a central position between the first end and the second end of the housing;
a plurality of circular rings positioned around the housing allowing for control of the speaker module at least one of the circular rings including electrical leads allowing for communication amongst the various speaker modules wherein one of the plurality of rings functions as a stand member allowing for elevation of the speaker module as a desired by user and includes an arcuate semi-circular first member and an arcuate semi-circular second member, the first member being pivotally secured to the housing for movement between different ring configurations.

8. The modular speaker system according to claim 7, wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

9. The modular speaker system according to claim 7, wherein an enclosure isolates the first driver within the housing, and the enclosure creates first and second isolated chambers within the housing, the first driver being within the first isolated chamber and the second driver being within the second isolated chamber.

10. A modular speaker system comprising:
a plurality of speaker modules configured prior to use to function in reproducing various sound channels depending upon specific desires of a user each of the plurality of speaker modules comprising:

a cylindrical housing including an open first end and a closed second end, as well as a cylindrical sidewall extending between the first end and the second end;

a first driver secured within the first end of the housing, the first driver being mounted within the first end of the housing for directing sound outwardly;

a second driver positioned within the housing at a central position between the first end and the second end of the housing;

a plurality of circular rings positioned around the housing allowing for control of the speaker module at least one of the circular rings including electrical leads allowing for communication amongst the various speaker modules, wherein each of the rings includes a plurality of flat surfaces equidistantly positioned about the circumference thereof, the flat surfaces being shaped and dimensioned for attachment to the flat surfaces of other speaker modules such that the speaker modules may be connected in a desired manner.

11. The modular speaker system according to claim 10, wherein the flat surfaces are magnetically active.

12. The modular speaker system according to claim 11, wherein the flat surfaces include electrical leads allowing for communication amongst the various speaker modules.

13. The modular speaker system according to claim 10, wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

14. The modular speaker system according to claim 10, wherein an enclosure isolates the first driver within the housing, and the enclosure creates first and second isolated chambers within the housing, the first driver being within the first isolated chamber and the second driver being within the second isolated chamber.

15. A speaker module configured prior to use to function in reproducing various sound channels depending upon specific desires of a user, comprising:

a cylindrical housing including an open first end and a closed second end, as well as a cylindrical sidewall extending between the first end and the second end;

a first driver secured within the first end of the housing, the first driver being mounted within the first end of the housing for directing sound outwardly;

a second driver positioned within the housing at a central position between the first end and the second end of the housing;

a plurality of circular rings positioned around the housing allowing for control of the speaker module, wherein one of the plurality of rings pivots about the housing for the purpose of turning the speaker module on or off, one of the plurality of rings moves between a first position and a second position to switch the speaker module from a nominal 4 ohm operating configuration to a nominal 8 ohm operating configuration, one of the plurality of rings rotates to open a port within the sidewall of the housing, or one of the plurality of rings functions as a stand member allowing for elevation of the speaker module as a desired by user.

16. The speaker module according to claim 15, wherein the one of the plurality of rings includes an arcuate semi-circular first member and an arcuate semi-circular second member, the first member being pivotally secured to the housing for movement between different ring configurations.

17. The modular speaker system according to claim 15, wherein the first driver completely closes off a central aperture at the first end of the housing and seals an interior of the housing from an external environment and the second driver is mounted in alignment with the first driver such that a central longitudinal axis of the housing extends through a center of both the first driver and the second driver.

18. The modular speaker system according to claim 15, wherein an enclosure isolates the first driver within the housing, and the enclosure creates first and second isolated chambers within the housing, the first driver being within the first isolated chamber and the second driver being within the second isolated chamber.

* * * * *